(12) United States Patent
Ikuta (10) Patent No.: US 9,507,080 B2
(45) Date of Patent: Nov. 29, 2016

(54) LIGHTING DEVICE, DISPLAY DEVICE AND TELEVISION DEVICE

(71) Applicant: Sharp Kabushiki Kaisha, Osaka-shi, Osaka (JP)

(72) Inventor: Kaori Ikuta, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/423,461

(22) PCT Filed: Aug. 27, 2013

(86) PCT No.: PCT/JP2013/072803
§ 371 (c)(1),
(2) Date: Feb. 24, 2015

(87) PCT Pub. No.: WO2014/034633
PCT Pub. Date: Mar. 6, 2014

(65) Prior Publication Data
US 2015/0185411 A1 Jul. 2, 2015

(30) Foreign Application Priority Data
Sep. 3, 2012 (JP) ................................ 2012-193062

(51) Int. Cl.
G09F 13/04 (2006.01)
F21V 8/00 (2006.01)
G02F 1/1333 (2006.01)
G02F 1/1335 (2006.01)

(52) U.S. Cl.
CPC ........... *G02B 6/0091* (2013.01); *G02B 6/0031* (2013.01); *G02B 6/0085* (2013.01); *G02B6/0086* (2013.01); *G02F 1/133308* (2013.01); *G02F 2001/13332* (2013.01); *G02F 2001/133314* (2013.01); *G02F 2001/133628* (2013.01)

(58) Field of Classification Search
CPC G02B 6/0091; G02B 6/0031; G02B 6/0085; G02F 1/133308; G02F 2001/13332
See application file for complete search history.

(56) References Cited

U.S. PATENT DOCUMENTS

| 8,704,974 | B2 | 4/2014 | Noh et al. |
| 2011/0085107 | A1 | 4/2011 | Noh et al. |
| 2013/0094245 | A1 | 4/2013 | Kanda et al. |
| 2014/0185324 | A1 | 7/2014 | Noh et al. |

FOREIGN PATENT DOCUMENTS

| JP | 2007-059231 A | 3/2007 |
| JP | 2011-082176 A | 4/2011 |
| JP | 2012-014949 A | 1/2012 |

OTHER PUBLICATIONS

Official Communication issued in International Patent Application No. PCT/JP2013/072803, mailed on Nov. 5, 2013.

*Primary Examiner* — Andrew Coughlin
*Assistant Examiner* — Meghan Ulanday
(74) *Attorney, Agent, or Firm* — Keating & Bennett, LLP

(57) ABSTRACT

A backlight device 12 includes LEDs 17, a light guide plate 16, a chassis 14, and a light source mounting member 30. The light guide plate 16 included a front surface configured as a light exit surface 16a, a rear surface configured as an opposite surface 16c, and two side surfaces configured as light entrance surface 16b. The light guide plate 16 is arranged such that the light entrance surface 16b are opposite light emitting surfaces 17a of the LEDs 17 and configured to guide light from the LEDs 17 toward the light exit surface 16a. The chassis 14 includes a plate-like portion 14a arranged on an opposite surface 16c side of the light guide plate 16. The light source mounting member 30 on which the LEDs 17 are mounted includes at least one bottom plate 30a including a front surface and a rear surface. The front surface is in surface-contact with a rear surface of the plate-like portion 14a. At least one portion of the rear plate surface is exposed to an external side.

12 Claims, 7 Drawing Sheets

LIGHTING DEVICE, DISPLAY DEVICE AND TELEVISION DEVICE

TECHNICAL FIELD

The present invention relates to a lighting device, a display device, and a television device.

BACKGROUND ART

Displays in image display devices, such as television devices, are now being shifted from conventional cathode-ray tube displays to thin display panels, such as liquid crystal panels and plasma display panels. With the thin display panels, the thicknesses of the image display devices can be reduced. Liquid crystal panels included in liquid crystal display devices do not emit light, and thus backlight devices are required as separate lighting devices. The backlight devices are classified broadly into an edge-light type and a backlight type according to mechanisms. Edge-light type backlight devices are preferable for further reducing the thickness of liquid crystal display devices. An example of edge-light type backlight devices is disclosed in Patent Document 1.

In a backlight device according to Patent Document 1, an LED board on which LEDs are mounted is arranged opposite an end surface of a light guide plate and the LED board is attached to a heat dissipation member. The LEDs are light sources. Heat generated while the LEDs are turned on is transferred to the heat dissipation member via the LED board. This configuration is for promoting heat dissipation. The heat dissipation member includes two plate surfaces. One of the plate surfaces is parallel to an edge surface of the light guide plate and the LED board is mounted thereon. The other plate surface extends inward from an edge of the one of the plate surfaces of the heat dissipation member (i.e., toward the middle of the light guide plate) along the plate surface of the light guide plate. In this backlight device, efficiency in heat dissipation via the heat dissipation member is improved by increasing a dimension of the heat dissipation member.

RELATED ART DOCUMENT

Patent Document

Patent Document 1: Japanese Unexamined Patent Application Publication No. 2012-14949

Problem to be Solved by the Invention

In a contact area between an LED board and a heat dissipation member, a high thermal contact resistance is observed. In the backlight device of Patent Document 1, when heat generated by the LEDs is transferred from the LED board to the heat dissipation member, the heat may not be properly transferred to the heat dissipation member. In such a case, heat may remain within a chassis of the backlight device and a large proportion of heat may be transferred to a touchable exterior member that forms an external appearance of the backlight device. If that occurs, a temperature of the exterior member may become high.

Disclosure of the Present Invention

The technology described herein was made in view of circumstances. An object of the technology described herein is to provide a lighting device having high heat dissipation capability without a heat dissipation member.

Means for Solving the Problem

A technology disclosed herein relates to a lighting device including a light source, a light guide plate, a chassis, and a light source mounting member. The light guide plate includes one plate surface configured as a light exit surface, another plate surface configured as an opposite surface, and at least one side surface configured as a light entrance surface. The light guide plate is arranged such that the light entrance surface is opposite a light emitting surface of the light source and configured to guide light from the light source toward the light exit surface. The chassis includes a plate-like portion arranged on an opposite surface side of the light guide plate. The light source mounting member on which the light source is mounted includes at least a bottom plate including one plate surface and another plate surface. The one plate surface is in surface-contact with a surface of the plate-like portion opposite from a surface thereof facing the light guide plate. At least a portion of the other plate surface is exposed to the outside.

In the lighting device, the rays of light from the light source enter the light guide plate through the light entrance surface, travel inside the light guide plate, and exit through the light exit surface. Heat produced by the light source while it is turned on is transferred to the light source mounting member and dissipated therethrough. In a configuration that the light source mounting member is mounted on a heat dissipation member, a proportion of the heat that has been transferred to the light source mounting member may not be properly transferred to the heat dissipation member. This is because the heat may be affected by the thermal contact resistance in the contact areas between the light source mounting member and the heat dissipation member. As a result, the heat may remain within inside the chassis. In the above lighting device, the bottom plate of the light source mounting member is in surface contact with the plate-like portion of the chassis and exposed to the outside of the lighting device. Therefore, a proportion of the heat that has been transferred to the light source mounting member is transferred to the chassis. The other proportion of the heat is directly dissipated from the exposed portion of the chassis to the outside. In comparison to a conventional backlight device in which heat is dissipated through a heat dissipation member, the heat dissipation efficiency improves. In the lighting device, heat generated by the light source is efficiently dissipated from the light source mounting member to the outside without a heat dissipation member. Namely, high heat dissipation efficiency is achieved without a heat dissipation member.

The light source mounting member may include a mounting plate on which the bottom plate is mounted. The mounting plate extends from the bottom plate toward a light exit surface side such that a plate surface of the mounting plate is parallel to the light entrance surface. The bottom plate may have a thickness larger than a thickness of the mounting plate.

According to this configuration, the thickness of the bottom plate can be increased in a direction corresponding to a thickness direction of the light guide plate. Namely, the heat dissipation capability of the bottom plate can be increased without increasing the dimension of the lighting device in a direction along a plate surface of the light guide plate. According to the above configuration, the heat dissipation efficiency improves although the frame size of the lighting device can be reduced.

The surface of the plate-like portion opposite from the surface thereof facing the light guide plate may include an area that is out of contact with the bottom plate and exposed to the outside.

According to this configuration, a large proportion of heat that is transferred from the bottom plate of the light source mounting member to the plate-like portion of the chassis is dissipated from the exposed portion of the plate-like portion of the chassis to the outside. Therefore, heat dissipation efficiency of the lighting device further improves.

The lighting device may further include a reflection sheet having light reflectivity. The reflection sheet may be in contact with the opposite surface of the light guide plate. The reflection sheet is sandwiched between the light guide plate and the plate-like portion of the chassis.

According to this configuration, since the reflection sheet is sandwiched between the light guide plate and the chassis, warping of the reflection sheet is less likely to occur. Therefore, a light reflecting function of the reflection sheet remains preferable.

A trace for supplying power to the light source may be formed on the light source mounting member on which the light source is mounted.

In this embodiment, the light source mounted on the light source mounting member is configured to emit light when power is supplied through the trace. A portion of the light source mounting member is exposed to the outside and the light source mounting member includes the bottom plate that is in surface contact with the chassis. Therefore, heat produced by the light source while it is turned on is efficiently dissipated to the outside.

Another technology disclosed herein relates to a display device including the above lighting device and a display panel including a display surface. The display panel is configured to display an image using light from the light exit surface of the light guide plate included in the lighting device.

According to this configuration, the lighting device configured to provide light to the display panel has high heat dissipation capability without a heat dissipation member. Therefore, effects including maintaining the frame-size of the display device small and improvement of operation reliability are exerted.

The display device may further include a frame-shaped member arranged on a display surface side of the display panel. The frame-shaped member may hold the display panel such that the display panel is sandwiched between the frame-shaped member and the lighting device. The light source mounting member may be arranged away from the frame-shaped member.

According to this configuration, the heat generated by the light source is less likely to be transferred from the light source mounting member to the frame-shaped member. The temperature of the frame-shaped member may increase due to heat; however, the temperature of the frame-shaped member is less likely to increase according to the above configuration. The frame-shaped member is arranged on the display surface side of the display panel and forms the external appearance of the display device. Therefore, the frame-shaped member tends to contact external objects. Since the temperature of the frame-shaped portion is less likely to increase, problems are less likely to occur even when external objects contact the frame-shaped member.

The display device may further include a fixing member that fixes the bottom plate to the frame-shaped member.

According to this configuration, the light source mounting member is stably held by the fixing member in the display device. Therefore, the display device maintains high heat dissipation efficiency.

The fixing member may be in contact with a portion of the light source mounting member. At least a portion of the fixing member that is in contact with the portion of the light source mounting member has thermal conductivity lower than thermal conductivity of the bottom plate.

According to this configuration, the light source mounting member is held by the fixing member. Furthermore, when heat generated by the light source is transferred to the light source mounting member, heat is less likely to be transferred from the light source mounting member to the frame-shaped member through the fixing member. Although the light source mounting member is properly held, temperature increase in the frame-shaped member is further less likely to occur.

The fixing member is arranged away from the light source mounting member. The display device may further include a cushioning member having a cushioning ability. The cushioning member is arranged between the fixing member and the light source mounting member and fixed to the fixing member and the light source mounting member.

According to this configuration, the light source mounting member is held by the fixing member while the cushioning member reduces friction sounds. Furthermore, since the cushioning member is arranged between the light source mounting member and the fixing member, heat is less likely to be transferred from the light source mounting member to the fixing member.

The cushioning member has thermal conductivity lower than thermal conductivity of the light source mounting member.

According to this configuration, heat is further less likely to be transferred from the light source mounting member to the fixing member.

The technologies described in this specification may be applied to a display device including a liquid crystal panel configured as the display panel and including a pair of substrates and liquid crystals sealed between the substrates. Furthermore, a television device including the above-described display device may be considered as new and advantageous.

Advantageous Effect of the Invention

According to the technology disclosed herein, a lighting device having high heat dissipation capability is provided without a heat dissipation member.

MODE FOR CARRYING OUT THE INVENTION

First Embodiment

A first embodiment will be described with reference to the drawings. A liquid crystal display device 10 (an example of a display device) according to this embodiment will be described. X-axis, Y-axis and Z-axis are indicated in some drawings. The axes in each drawing correspond to the respective axes in other drawings. The Y-axis direction corresponds to a vertical direction and the X-axis direction corresponds to a horizontal direction. An upper side and a lower side are based on the vertical direction unless otherwise specified.

Figure 3:
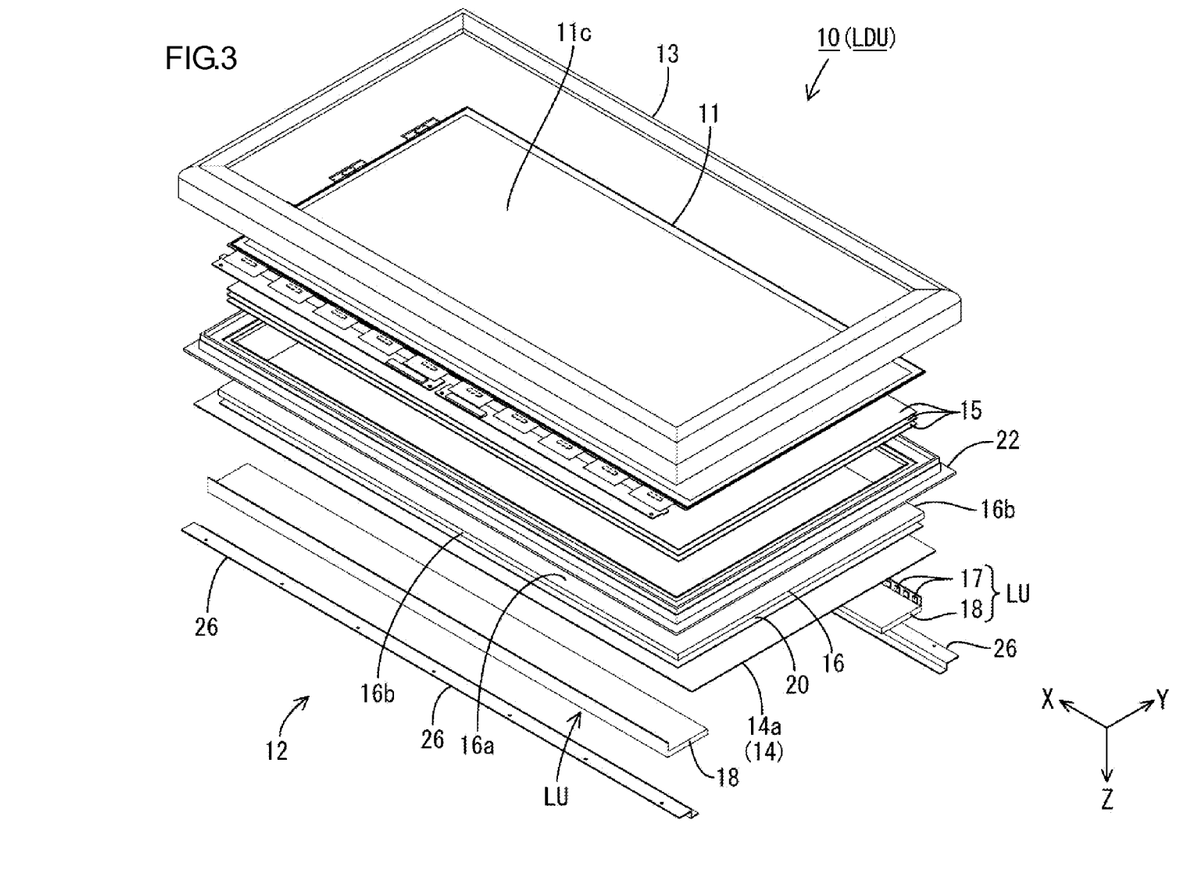
FIG. 3 is an exploded perspective view illustrating a general configuration of the liquid crystal display unit LDU of the liquid crystal display device 10.

A television device TV according to this embodiment includes a liquid crystal display unit LDU, boards PWB, MB, and CTB, a cover CV, and a stand ST. The boards PWB, MB, and CTB are attached to a rear surface (a back surface) of the liquid crystal display unit LDU. The cover CV is attached to the rear surface of the liquid crystal display unit LDU so as to cover the boards PWB, MB, and CTB. The stand ST holds the liquid crystal display unit LDU such that a display surface of the liquid crystal display unit LDU extends in the Y-axis direction (the vertical direction). The liquid crystal display device 10 according to this embodiment has the same configuration as the above-described television device TV except for at least a component for receiving television signals (e.g. a tuner included in a main board MB). As illustrated in FIG. 3, the liquid crystal display unit LDU has a horizontally-long rectangular overall shape (rectangular). The liquid crystal display unit LDU includes a liquid crystal panel (an example of a display panel) 11, a backlight device (an example of a lighting device) 12, and an outer frame (an example of a frame-shaped member) 13. The liquid crystal panel 11 includes a display surface for displaying images. The backlight device 12 is an external light source. The outer frame 13 is disposed more to the front (a display surface 11c side) than the display surface 11c of the liquid crystal panel 11. The outer frame 13 and the backlight device 12 hold the liquid crystal panel 11 therebetween. The outer frame 13 and a chassis 14 included in the backlight device 12 are external components that form an external appearance of the liquid crystal display device 10. The chassis 14 according to this embodiment is one of the components of the backlight device 12 although it is one of the external components.

Figure 1:
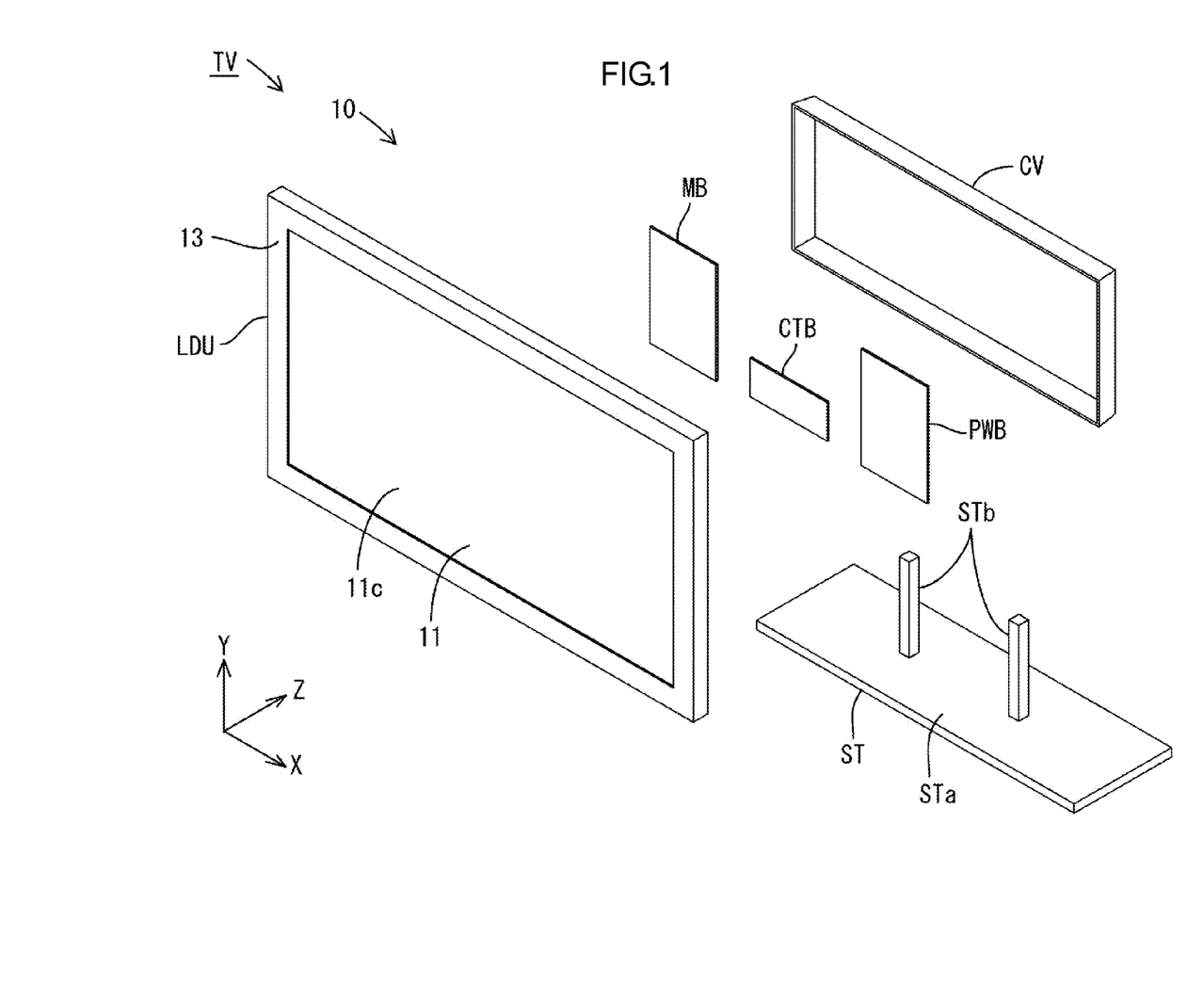
FIG. 1 is an exploded perspective view illustrating a general configuration of a television device TV and a liquid crystal display unit LDU according to a first embodiment of the present invention.
Figure 2:
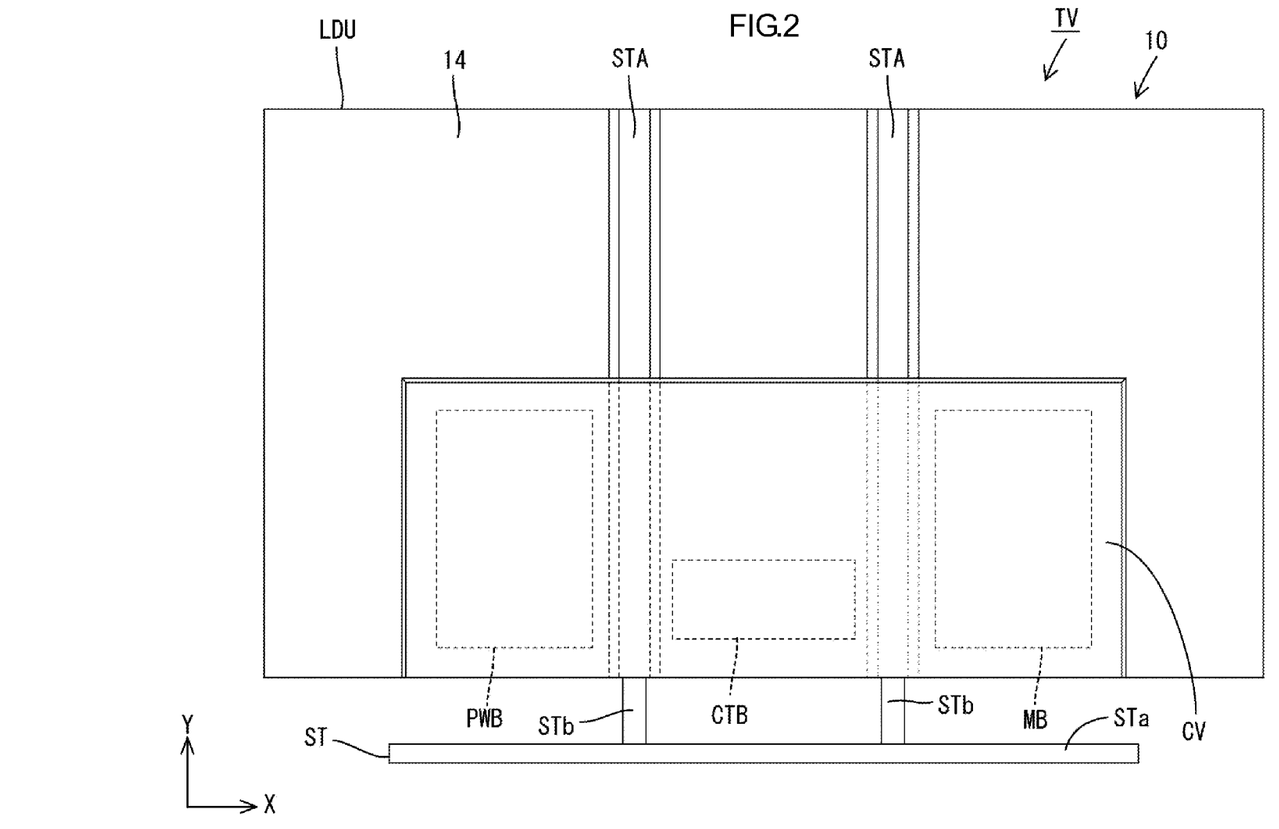
FIG. 2 is a rear view of the television device TV and a liquid crystal display device 10.

Configurations of the liquid crystal display device 10 on the rear surface side will be described. As illustrated in FIG. 2, stand fitting members STA are attached to a rear surface of the chassis 14 that forms a rear external appearance of the liquid crystal display device 10. The stand fitting members STA are spaced away from each other in an X-axis direction and extend along the Y-axis direction. Each stand fitting member STA has a cross section that corresponds to a cross section of a channel beam and opens to the chassis 14. A space is provided between the stand fitting member STA and the chassis 14. Support portions STb included in the stand ST are inserted in the respective stand fitting members STA.

The stand ST includes a base STa and the support portions STb. The base STa extends parallel to the X-Z plane. The support portions STb stand on the base STa in the Y-axis direction. The cover CV is made of synthetic resin and attached to a part of the rear surface of the chassis 14. Specifically, as illustrated in FIG. 2, the cover CV covers a lower half part of the chassis 14 so as to cross over the stand fitting members STA in the X-axis direction. A component storage space is provided between the cover CV and the chassis 14 such that the boards PWB, MB, and CTB, which will be described next, are arranged therein.

As illustrated in FIG. 2, the liquid crystal display device 10 includes a power source board PWB, a main board MB, and a control board CTB as the boards PWB, MB, and CTB. The power source board PWB will be referred to as a power supply of the liquid crystal display device 10 and supplies drive power to the other boards MB and CTB and LEDs (an example of a light source) 17 included in the backlight device 12. Namely, the power source board PWB also serves as "an LED drive board (a light source drive board, a light source) which drives the LEDs 17." The main board MB includes at least a tuner and an image processor, which are not illustrated. The tuner is configured to receive television signals. The image processor performs image processing on the received television signals. The main board MB is configured to output the processed image signals to the control board CTB, which will be described next. If an external image reproducing device, which is not illustrated, is connected to the liquid crystal display device 10, image signals from the image reproducing device are input to the main board MB. The image processor included in the main board MB processes the image signals, and the main board MB outputs the processed image signals to the control board CTB. The control board CTB is configured to convert the image signals, which is transferred from the main board, to driving signals for controlling liquid crystals and to supply the driving signals to the liquid crystal panel 11.

As illustrated in FIG. 3, components of the liquid crystal display unit LDU included in the liquid crystal display device 10 are arranged in a space between the outer frame 13 that provides a front external appearance and the chassis 14 and two fixing members 26, 26 that provide a rear external configuration. The components arranged among the outer frame 13, the chassis 14, and the two fixing members 26, 26 include at least the liquid crystal panel 11, an optical member 15, a light guide plate 16, an inner frame (an example of a frame-shaped member) 22 and LED units LU. The liquid crystal panel 11 and the optical member 15 are layered and held between the outer frame 13 on the front side and the inner frame 22 on the rear side. The backlight device 12 includes the light guide plate 16, the inner frame 22, the LED units LU, and the chassis 14. Namely, the configuration of the backlight device 12 corresponds to the liquid crystal display unit LDU without the liquid crystal panel 11, the optical member 15, and the outer frame 13. The LED units LU included in the backlight device 12 are arranged in the space between the inner frame 22 and the chassis 14. Two LED units LU are arranged such that the light guide plate 16 are sandwiched therebetween with respect to the short-side direction of the light guide plate 16 (the Y-axis direction, the vertical direction). The arrangement direction in which the LED units LU and the light guide plate 16 are arranged corresponds to the Y-axis direction. Each LED unit LU includes LEDs 17 as light sources and a light source mounting member 18 on which the LEDs 17 are mounted. Each component will be described next.

Figure 4:
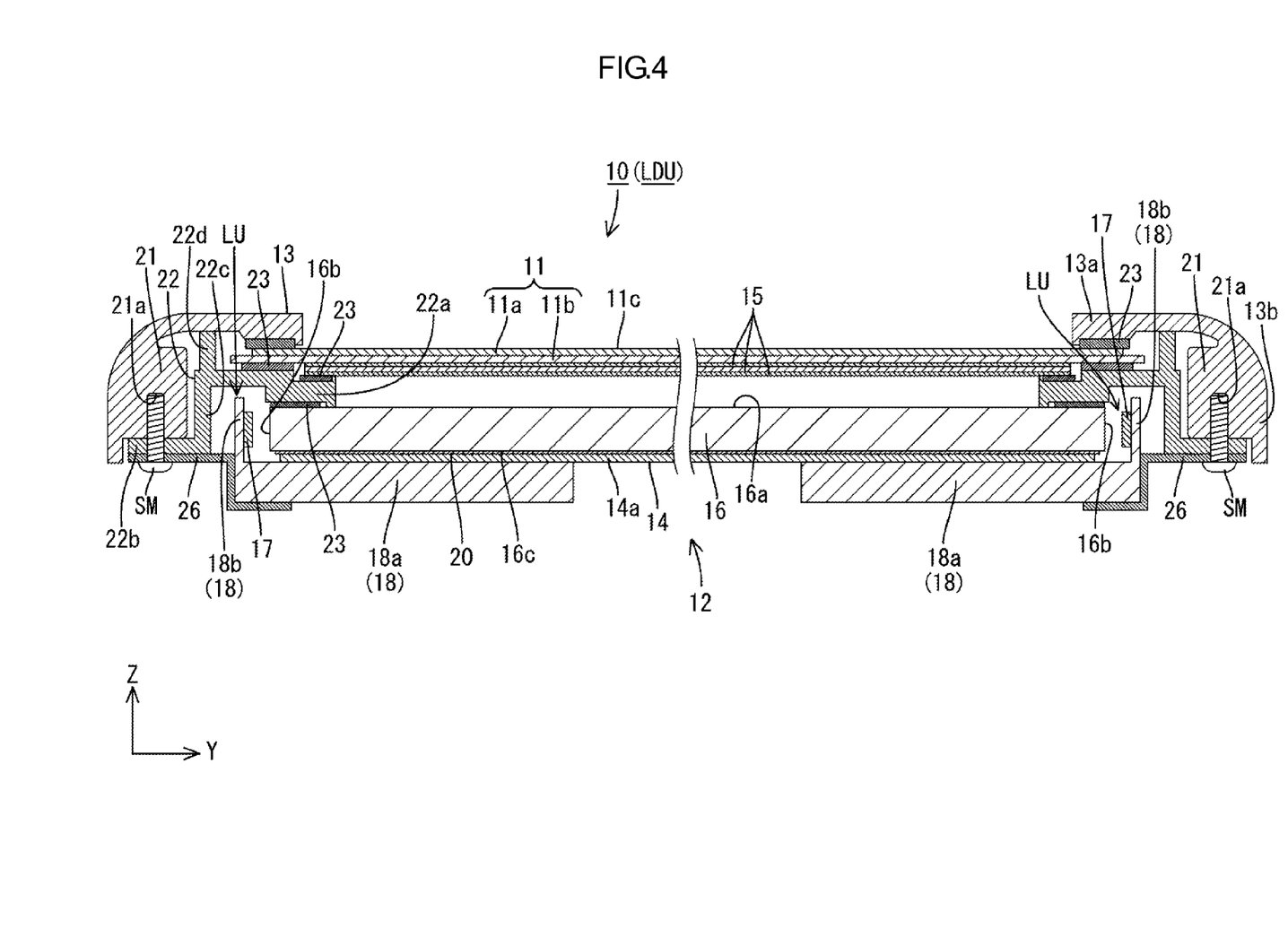
FIG. 4 is a cross-sectional view of the liquid crystal display device 10 taken along a short-side direction thereof.

As illustrated in FIGS. 3 and 4, the liquid crystal panel 11 has a horizontally-long rectangular shape (rectangular and longitudinal) in a plan view and includes a pair of glass substrates 11a and 11b and liquid crystals. The substrates 11a and 11b having high light transmissivity are bonded together with a predetermined gap therebetween. The liquid crystals are sealed between the substrates 11a and 11b. One of the substrate 11a, 11b on the front side is a CF board 11a. The other one of the substrate 11a, 11b on the rear side (the back side) is an array board 11b. On the array board 11b, switching components (e.g. TFTs), pixel electrodes, and an alignment film are arranged. The switching components are connected to gate lines and source lines that are arranged perpendicular to each other. The pixel electrodes are connected to the switching components. On the CF board 11a, color filters, a counter electrode, and an alignment film are arranged. The color filters include red (R), green (G), and blue (B) color portions that are arranged in a predetermined arrangement. Polarizing plates (not illustrated) are disposed on outer surfaces of the boards 11a, 11b, respectively.

Among the boards 11a, 11b of the liquid crystal panel 11, as illustrated in FIG. 4, the array board 11b has a plan-view size larger than the CF board 11a. Edge portions of the array board 11b project over the CF board 11a. Specifically, the array board 11b is slightly larger than the CF board 11a such that the outer edges of the array board 11b are located outer than the outer edges of the CF board 11a for the entire periphery of the array board 11b. Terminals are disposed at one of the edge portions of the array board 11b on a long edge. The gate lines and the source lines are routed from the terminals. Flexible circuit boards on which drivers for driving liquid crystals are mounted are connected to the terminals. Signals are transferred from the control board CTB to the terminals via the flexible circuit boards. According to the signals, images are displayed on the display surface 11c of the liquid crystal panel 11.

As illustrated in FIG. 4, the liquid crystal panel 11 is placed on the front surface of the optical member 15 (on a light exiting side), which will be described next. The back surface of the liquid crystal panel 11 (a back surface of one of the polarizing plates on the rear side) is attached to the optical member 15 with little gap. With this configuration, dust or other substances are less likely to enter between the liquid crystal panel 11 and the optical member 15. The display surface 11c of the liquid crystal panel 11 includes a display area and a non-display area. The display area corresponding to a central region of the screen is configured to display images. The non-display area corresponds to a frame-shaped outer area of the screen around the display area. The liquid crystal panel 11 has a plan-view size (the short dimension by the long dimension) which is slightly larger than the optical member 15, which will be described next. Outer edge portions of the liquid crystal panel 11 project over the optical member 15.

As illustrated in FIG. 3, similar to the liquid crystal panel 11, the optical member 15 has a horizontally-long rectangular shape in a plan view and has a plan-view size (a short dimension by a long dimension) slightly smaller than the liquid crystal panel 11. The optical member 15 is placed on a front surface of the light guide plate 16, which will be described later, and sandwiched between the light guide plate 16 and the liquid crystal panel 11. The optical member 15 includes three sheets that are placed on top of one another. Specifically, a diffuser sheet 15a, a lens sheet (a prism sheet) 15b, and a reflecting type polarizing sheet 15c are placed on top of one another in this sequence from the rear side (the light guide plate 16 side). Each of the three sheets 15a, 15b, and 15c has the substantially same size in a plan view.

Next, the outer frame 13 that is the external member and configured to hold down the liquid crystal panel from the front side will be described. The outer frame 13 is made of metal such as aluminum and thus mechanical strength (rigidity) and thermal conductivity thereof are high in comparison to an outer frame made of synthetic resin. As illustrated in FIGS. 3 and 4, the outer frame 13 is in a horizontally-long rectangular overall shape of frame so as to surround the display area of the display surface 11c of the liquid crystal panel 11. The outer frame 13 includes a panel-holddown portion 13a and a sidewall portion 13b. The panel-holddown portion 13a is parallel to the display surface 11c of the liquid crystal panel 11 and configured to hold down the liquid crystal panel 11 from the front side. The sidewall portion 13b projects from an outer edge portion of the panel-holddown portion 13a toward the rear side. The outer frame 13 has an L-like cross section. The panel-holddown portion 13a is in a horizontally-long rectangular shape of frame along the outer edge portion of the liquid crystal panel 11 (the non-display area, the frame portion). The panel-holddown portion 13a is configured to hold down the outer edge portion of the liquid crystal panel 11 for the entire length. A cushion 23 is disposed between the panel-holddown portion 13a and the liquid crystal panel 11. An outer surface of the panel-holddown portion 13a facing the front side (an opposite surface from a surface that faces the liquid crystal panel 11) is exposed to the outside and viewed from the front side of the liquid crystal display device 10 similar to the display surface 11c of the liquid crystal panel 11. The surface of the panel-holddown portion 13a and the display surface 11c of the liquid crystal panel 11 from the front appearance of the liquid crystal display device 10. The sidewall portion 13b is in a rectangular tube-like shape that project from the outer edge portion of the panel-holddown portion 13a toward the rear side. The sidewall portion 13b surrounds an entire periphery of the backlight device 12 (the inner frame 22, the light source mounting members 18, and the fixing members 26). Outer surfaces of the sidewall portion 13b along the periphery of the liquid crystal display device 10 is exposed and viewed from the sides. The outer surfaces form the top, bottom, and side appearances of the liquid crystal display device 10.

As illustrated in FIG. 4, screw mounting portions 21 are integrally formed with inner surfaces of the sidewall portion 13b. Screws SM are mounted to the respective screw mounting portions 21 from the rear side. Each screw mounting portion 21 has a block-like shape and projects inward (toward the inner frame 22) from the inner surface of the sidewall portion 13b. The screw mounting portions are arranged away from each other along edges of the sidewall portion 13b in directions in which the edges extend, respectively. The screw mounting portions 21 are configured such that the inner frame 22 is sandwiched between the fixing members 26 and the screw mounting portions 21 and held with the screws SM that are mounted from the rear side to the fixing members 26. Each screw mounting portion 21 has a mounting hole 21a that opens to the rear side. The mounting hole 21a is for tightening the screw SM.

Next, components of the backlight device 12 will be described. The light guide plate 16 is made of transparent (i.e., having high light transmissivity) synthetic resin (e.g., acrylic resin such as PMMA, polycarbonate) having a refractive index sufficiently higher than that of air. As illustrated in FIG. 3, the light guide plate 16 has a horizontally-long rectangular plan-view shape similar to the liquid crystal panel 11 or the optical member 15. A long-side direction and a short-side direction of a plate surface of the light guide plate 16 correspond to the X-axis direction and the Y-axis direction, respectively. A thickness direction that is a direction perpendicular to the plate surface of the light guide plate 16 corresponds to the Z-axis direction (a direction in which the light guide plate 16 is placed on the liquid crystal panel 11). A ratio between a short dimension and a long dimension of the light guide plate 16 is 9:16. The light guide plate 16 is arranged behind the optical member 15 with a predetermined distance away from the optical member 15 so as to oppose the optical member 15. The light guide plate 16 is sandwiched between the LED units LU in the Y-axis direction. The LED units LU are arranged away from each other in the short-side direction of the light guide plate 16 (in the Y-axis direction). Rays of light from the LEDs 17 enter the light guide plate 16 from ends of the short dimension of the light guide plate 16. The light guide plate 16 is configured to guide the light from the rays of light from the LEDs 17 that enter from the ends travel inside the light guide plate 16 and exit toward the optical member 15 (to the front side).

As illustrated in FIG. 4, the plate surface of the light guide plate 16 on the front side (the opposed surface to the optical member 15) is configured as a light exit surface 16a. The rays of light in the light guide plate 16 exit through the light exit surface 16a toward the optical member 15 and the liquid crystal panel 11. Among the side surfaces of the light guide plate 16 adjacent to the plate surface thereof, the long side surfaces that are elongated in the X-axis direction (or end surfaces at the ends of the short dimension) are arranged opposite the LEDs 17 (the respective LED boards 18) with a predetermined gap. The long side surfaces are configured as light entrance surfaces 16b through which the rays of light emitted by the LEDs 17 enter. The light entrance surfaces 16b are parallel to the X-Z plane (the plate surfaces of the LED boards 18) and substantially perpendicular to the light exit surface 16a. The arrangement direction of the LEDs 17 and each light entrance surface 16b corresponds to the Y-axis direction and perpendicular to the light exit surface 16a. The light entrance surfaces 16b are opposed to the LEDs 17, that is, the light entrance surfaces 16b are "end surfaces opposite the LEDs (end surfaces opposite light sources)." Among the side surfaces of the light guide plate 16 adjacent to the plate surface thereof, the short side surfaces that are elongated in the Y-axis direction are end surfaces that are not opposite the LEDs 17 (end surfaces that are not opposite light sources).

As illustrated in FIG. 4, a reflection sheet 20 is disposed on an opposite surface 16c of the light guide plate 16 on the rear side, that is, opposite from the light exit surface 16a (i.e., an opposed surface to the chassis 14). The reflection sheet 20 covers about an entire area of the opposite surface 16c. The reflection sheet 20 is configured to reflect rays of light that exit through the opposite surface 16c to the rear side toward the front side. The reflection sheet 20 is arranged between the chassis 14 and the light guide plate 16, that is, sandwiched therebetween. The reflection sheet 20 is made of synthetic resin. Surfaces of the reflection sheet 20 are in white that provides high light reflectivity. At least one of the light exit surface 16a and the opposite surface 16c opposite therefrom of the light guide plate 16 includes a light reflecting portion (not illustrated) or a light scattering portion (not illustrated). The light reflecting portion is for reflecting the rays of light inside the light guide plate 16. The light scattering portion is for scattering the rays of light inside the light guide plate 16. The light reflecting portion or the light scattering portion are formed by patterning with a predetermined in-plane distribution so that exiting rays of light through the light exit surface 16a exhibit a uniform in-plane distribution.

As illustrated in FIGS. 3 and 4, the inner frame 22 is in a horizontally-long rectangular overall shape of frame similar to the outer frame 13. The inner frame 22 is made of synthetic resin. Surfaces of the inner frame 22 are in black, that is, have light blocking properties. The inner frame 22 includes inner frame portions 22a, outer frame portions 22b, connecting portions 22c, and outer frame supporting portions 22d. The inner frame portions 22a are arranged between the light guide plate 16 and the optical member 15 and the liquid crystal panel 11. The outer frame portions 22b are arranged between the outer frame 13 and the fixing members 26. The connecting portions 22c connect the inner frame portions 22a to the outer frame portions 22b. The outer frame supporting portions 22d support the outer frame 13 from the rear side. The inner frame portions 22a hold down the outer edge portion of the light guide plate 16 from the front side for about an entire length. The inner frame portions 22a receive the outer edge portions of the liquid crystal panel 11 and the optical member 15 from the rear side for about entire lengths. Outer portions of the inner frame portions 22a are configured to receive the outer edge portions of the liquid crystal panel 11. Inner portions of the inner frame portions 22a are configured to receive the outer edge portions of the optical member 15. The outer portions project from the inner edge portions to the front side in a step-like form. Cushions 23 are disposed between the liquid crystal panel 11 and the inner frame portions 22a, between the optical member 15 and the inner frame portions 22a, and between light guide plate 16 and the inner frame portions 22a. The outer frame portions 22b are arranged more to the rear side than the inner frame portions 22a. The outer frame portions 22b are sandwiched between the outer edge portions of the fixing members 26 and the screw mounting portions 21 of the outer frame 13 and screwed. The connecting portions 22c connect the inner edges of the outer frame portions 22b on the rear side to the outer edges of the inner frame portions 22a on the front side. The connecting portions 22c extend in the Z-axis direction from the inner edges to the outer edges. The outer frame supporting portions 22d project from the outer edge portions of the respective inner frame portions 22a toward the front side. The outer frame supporting portions 22d are in contact with the back surface of the outer frame 13 and mechanically support the outer frame 13 for reinforcement purposes.

Next, the chassis 14 that is one of the external components that form the external appearance will be described. The chassis 14 is made of metal such as aluminum and thus has high mechanical strength (rigidity) and thermal conductivity in comparison to one that is made of synthetic resin. As illustrated in FIG. 3, the chassis 14 includes a plate-like portion 14a having a horizontally-long and flat plate-like overall shape that covers the light guide plate 16 and the reflection sheet 20 from the rear side for about an entire area. The plate-like portion 14a is arranged such that an overall area of a front surface 14a1 of the plate-like portion 14a is in surface-contact with a rear surface of the reflection sheet 20. The plate-like portion 14a holds the rear plate surface 16c of the light guide plate 16 with the reflection sheet 20 in-between. Namely, the reflection sheet 20 is sandwiched between the plate-like portion 14a and the rear plate surface 16c of the light guide plate 16. A rear outer surface of the plate-like portion 14a (a surface that is opposite from a surface facing the light guide plate 16 and the reflection sheet 20) includes a portion that does not overlap the light source mounting members 18, which will be described later, in a plan view. The portion is exposed from the rear side of the liquid crystal display device 10 to the outside and forms a back surface of the liquid crystal display device 10. As described above, since the reflection sheet 20 is sandwiched between the light guide plate 16 and the chassis 14, warping of the reflection sheet 20 is less likely to occur even when heat is transferred to the reflection sheet 20.

Next, configurations of the LEDs 17 and the light source mounting members 18 included in the LED units LU will be described one by one. Each LED 17 includes a board fixed to the corresponding light source mounting member 18, as illustrated in FIGS. 3 and 4, and an LED chip disposed on the board and sealed with a resin. Each LED chip mounted on the board is configured to emit light with a single main emitting wavelength, specifically, in a single color of blue. The resin that seals the LED chip contains phosphors that emit specific color of light, substantially white light, when excited by the blue light from the LED chip. The phosphors are scattered in the resin. The phosphors may be selected from yellow phosphors that emits yellow light, green phosphors that emits green light, and red phosphors that emits red light or a combination of those as appropriate. A surface of the LED 17 opposite from a mounting surface thereof that is mounted to the light source mounting member 18 (a surface opposite the light entrance surface 16b of the light guide plate 16) is a main light emitting surface 17a. Namely, the LED 17 is a so-called top light emitting type. The main light emitting surface 17a of the LED 17 has a substantially rectangular shape that extends in the horizontal direction (elongated in the X-axis direction) when viewed from the front.

Each light source mounting member 18 is made of metal having high thermal conductivity such as aluminum. As illustrated in FIGS. 3 and 4, the light source mounting member 18 extends in the long-side direction of the light guide plate 16 (the X-axis direction). The length of the light source mounting member 18 is about the same as the long dimension of the light guide plate 16. The light source mounting member 18 has a bent with a substantially L-shaped cross section. The light source mounting member 18 includes a bottom plate 18a and a mounting plate 18b. The bottom plate 18a extends parallel to the rear plate surface of the chassis 14. The mounting plate 18b extends from the bottom plate 18a toward the light exit surface 16a so as to face the light entrance surface 16b of the light guide plate 16. The LEDs 17 are mounted on the mounting plate 18b. The bottom plate 18a has a relatively large plate thickness. The mounting plate 18b has a relatively small plate thickness.

Figure 5:
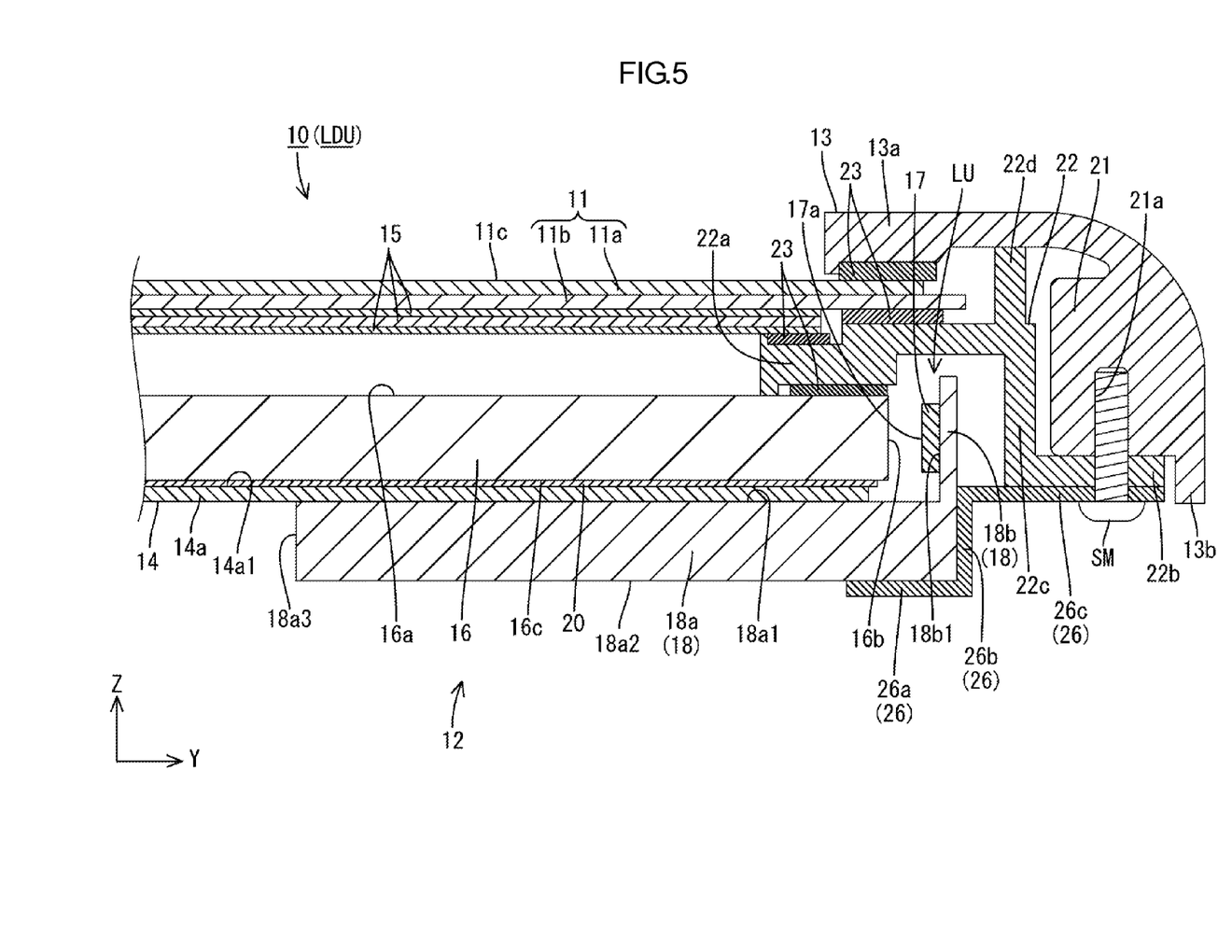
FIG. 5 is a magnified cross-sectional view of a portion of FIG. 4, illustrating one of light source mounting members 30 and therearound.

As illustrated in FIG. 5, the bottom plate 18a of the light source mounting member 18 has a plate-like shape with a long-side direction, a short-side direction, and a thickness direction thereof correspond to the X-axis direction, the Y-axis direction, and the Z-axis direction, respectively. The bottom plate 18a extends over a large area in the Y-axis direction, that is, in the short-side direction of the light guide plate 16. A large portion of the bottom plate 18a overlaps the plate-like portion 14a of the chassis 14 in a plan view. A portion of the bottom plate 18a opposed to the rear surface of the chassis 14, namely, substantially an entire area of a front surface 18a1 of the bottom plate 18a is attached to the chassis 14 with a fixing member 26, such as a double sided tape and an adhesive. The portions of the bottom plates 18a that are attached to the chassis 14 hold the chassis 14 and the reflection sheet 20 between the light guide plate 16 and the portions of the bottom plates 18a with respect to the Z-axis direction. Furthermore, the portions of the bottom plates 18a that are attached to the chassis 14 overlap the light guide plate 16 in a plan view. According to this configuration, frame sizes of the liquid crystal display device 10 and the backlight device 12 are reduced. The bottom plates 18a include rear surfaces 18a2 and edge surfaces 18a3, respectively. The rear surface 18a2 of each bottom plate 18a includes a portion to which the fixing member 26, which will be described later, is not fixed. The edge surface 18a3 of each bottom plate 18a is located on an inner side with respect to the Y-axis direction (an opposite side from a light entering surface 16b). An entire surface of the edge surface 18a3 and the portion of the rear surface 18a2 are exposed to the outside of the liquid crystal display device 10. According to this configuration, a large proportion of the heat that is transferred to the light source mounting member 18 is directly dissipated from the exposed portion of the light source mounting member 18 to the outside of the liquid crystal display device 10. Another portion of the rear surface 18a2 of the bottom plate 18a that is not exposed to the outside of the liquid crystal display device 10 is supported by the fixing member 26, which will be described later.

As illustrated in FIG. 5, the mounting plate 18b of the light source mounting member 18 is arranged a predetermined distance away from the light entrance surface 16b such that the plate surface thereof is parallel to the X-Y plane, that is, to the light entrance surface 16b of the light guide plate 16. The light source mounting plate 18b has a plate-like shape orientated with a long-side direction, a short-side direction, and a thickness direction corresponding to the X-axis direction, the Z-axis direction, and the Y-axis direction, respectively. The mounting plate 18b extends from an outer edge of the bottom plate 18a in the Z-axis direction toward the front side. The LEDs 17 are surface mounted on an inner plate surface of the mounting plate 18b, that is, the plate surface that faces the light guide plate 16. The inner plate surface is a mounting surface 18b1. The LEDs 17 are arranged parallel to each other on the mounting surface 18b1 of the mounting portion 18b in line (or linearly) at predetermined intervals along the longitudinal direction thereof (the X-axis direction). Namely, multiple LEDs 17 are arranged parallel to each other along the long edges of the backlight device 12 close to the long edges of the backlight device 12. Distances between the adjacent LEDs 17 in the X-axis direction are substantially equal, that is, the LEDs 17 are arranged at substantially equal intervals. The mounting plates 18b and the LEDs 17 mounted thereon are covered with the inner frame 22 from the front side and physically and optically isolated from the outer frame 13, the liquid crystal panel 11, and the optical member 15. Therefore, the mounting plates 18b are maintained in a condition that they are not in contact with the outer frame 13 and thus heat produced by the LEDs 17 are not directly transferred to the outer frame 13 via the mounting plates 18b. Traces (not illustrated) are formed on the mounting surfaces 18b1 of the mounting plates 18b. The traces extend in the X-axis direction and cross the LEDs 17 to connect the adjacent LEDs 17 one another in series. The traces are metal films (copper foils). Terminals are provided at ends of the traces. Driving power is supplied to the LEDs 17 when the terminals are connected to an external LED driving circuit.

Next, the fixing members 26 for holding the light source mounting members 18 from the rear side will be described. As illustrated in FIG. 5, each fixing member 26 for holding the light source mounting member 18 is disposed at an outer end portion of the corresponding bottom plate 18a with respect to the Y-axis direction (a light entering surface 16b side). The fixing member 26 is made of a synthetic resin having a lower thermal conductivity. The fixing member 26 holds down the light source mounting member 18 from the rear side (i.e., the side opposite from the chassis 14). The fixing member 26 is fixed to the outer frame supporting portion 22d of the inner frame 22. The fixing members 26 include first holding portions 26a, second holding portions 26b, and extending portions 26c, respectively. The first holding portion 26a is parallel to the rear surface 18a2 of the bottom plate 18a and in surface contact with an outer end portion of the rear plate surface 18a2 with respect to the Y-axis direction (the light entrance surface 16b side). The second holding portion 26b extends from an outer end portion of the first holding portion 26a toward the front side (the liquid crystal panel 11 side) so as to be perpendicular to the first holding portion 26a. The second holding portion 26b is in surface contact with an outer edge surface of the bottom plate 18a. The extending portion 26c extends from a front edge portion of the second holding portion 26b toward the outer side (a side opposite from the light guide plate 16). The first holding portion 26a is fixed to the rear surface of the bottom plate 18a with an adhesive tape or a bond and thus holds the bottom plate 18a from the rear side. The second holding portion 26b is fixed to the outer edge surface of the bottom plate 18a with an adhesive tape or a bond, similar to the first holding portion 26a, and thus holds the bottom plate 18a from the edge surface side. A portion of the extending portion 26c close to an end thereof in the extending direction is in surface contact with the outer frame supporting portion 22d of the inner frame 22. The extending portion 26 includes screw holes formed in the portion that is in surface contact with the outer frame supporting portion 22d of the inner frame 22. The screws SM are inserted in the screw holes. When the screws SM are tighten, the extending portion 26c is fixed to the outer frame supporting portion 22d of the inner frame 22 and the screw mounting portion 21 of the outer frame 13. Namely, the fixing members 26 have a function for holding the light source mounting members 18 exerted through fixing of the fixing members 26 to the inner frame 22 and the outer frame 13 and fitting of the fixing members 26 with the light source mounting members 18. Each fixing member 26 extends along the long-side direction of the corresponding light source mounting member 18 (the X-axis direction). A long dimension of the fixing member 26 (a dimension in the X-axis direction) is substantially the same as a long-side dimension of the light source mounting member 18.

Configurations of the liquid crystal display device 10 according to this embodiment are as described above. Next, a heat dissipation route through which heat that is generated by the LEDs 17 while they are turned on is dissipated will be described. While the LEDs 17 are turned on, heat is generated by the LEDs 17. The heat is transferred to the mounting plate 18b of the light source mounting member 18. Because thermal contact resistance in contact areas between the LEDs 17 and the mounting plate 18b is not very high, a large proportion of the heat from the LEDs 17 is transferred to the mounting plate 18b (toward the light source mounting member 18). A large portion of the bottom plate 18a of the light source mounting member 18 is exposed to the outside of the liquid crystal display device 10. Therefore, a large proportion of the heat transferred to the light source mounting member 18 is directly and efficiently dissipated from the exposed portion to the outside of the liquid crystal display device 10. A certain proportion of heat that is transferred to the light source mounting member 18 but not dissipated to the outside of the liquid crystal display device 10 is transferred to the plate-like portion 14a of the chassis 14. A portion of the plate-like portion 14a of the chassis 14 where the light source mounting members 18 are not in contact is exposed to the outside of the liquid crystal display device 10. Therefore, a large proportion of heat transferred to the plate-like portion 14a of the chassis 14 is directly and efficiently dissipated from the exposed portion of the plate-like portion 14a to the outside of the liquid crystal display device 10. Some amount of heat that is transferred to the plate-like portion 14a of the chassis 14 but not dissipated to the outside of the liquid crystal display device 10 may be transferred to the inner frame 22, the outer frame 13, and the optical member 15 via the light guide plate 16. As described above, a large proportion of heat transferred from the LEDs 17 to the light source mounting members 18 is directly dissipated from the light source mounting members 18 and the chassis 14 to the outside of the liquid crystal display device 10. Therefore, only a small proportion of heat is transferred to the inner frame 22, the outer frame 13, and the optical member 15.

Heat generated by the LEDs 17 is dissipated through the heat dissipation route as described above. According to this configuration, within a short time, a large proportion of heat generated by the LEDs 17 is transferred to the light source mounting members 18 and dissipated to the outside of the liquid crystal display device 10 and the backlight device 12. Therefore, heat generated by the LEDs 17 is less likely to remain inside the liquid crystal display device 10. Compared to a conventional configuration in which heat tends to remain inside the chassis, the heat dissipation capabilities of the liquid crystal display device 10 and the backlight device 12 significantly improve. Further, since the heat generated by the LEDs 17 is less likely to remain inside the liquid crystal display device 10, the temperature of soldered portions between the LEDs 17 and the LED boards 18 does not or is less likely to increase. Therefore, degradation in light emitting characteristics of the LEDs 17 due to high temperature in soldered portions is less likely to occur. Furthermore, since heat generated by the LEDs 17 is less likely to remain inside the liquid crystal display device 10, heat is less likely to be transferred toward the optical member 15. Therefore, degradation in display quality on the display surface 11c of the liquid crystal panel 11 resulting from warping of the optical member 15 due to the heat does not or is less likely to occur.

According to this embodiment, the bottom plate 18 of each light source mounting member 18 including a large portion exposed to the outside has a plate-like shape that extends to the inner side (the side opposite from the light entrance surface). By extending the bottom plate 18a in the extending direction thereof (i.e. the Y-axis direction), an area of the exposed portion of the bottom plate 18a increases without increasing the thickness of the backlight device 12. With this configuration, heat generated by the LEDs 17 is directly dissipated from the light source mounting members 18 to the outside, that is, this configuration improves heat dissipation. As a result, high heat dissipation capability is achieved while the thickness of the backlight device 12 remains small.

In the backlight device 12 according to this embodiment, the rays of light from the LEDs 17 enter the light guide plate 16 through the light entrance surfaces 16b, travel inside the light guide plate 16, and exit through the light exit surface 16a. Heat produced by the LEDs 17 while they are turned on is transferred to light source mounting members 18 and dissipated therethrough. In a configuration that the light source mounting members 18 are mounted on heat dissipation members, a proportion of the heat that has been transferred to the light source mounting members 18 may not be properly transferred to the heat dissipation members. This is because the heat may be affected by the thermal contact resistance in the contact areas between the light source mounting members 18 and the heat dissipation members during heat transfer from the light source mounting members 18 to the heat dissipation members or other components. As a result, the heat may remain within the chassis. In the backlight device 12 according to this embodiment, the bottom plates 18a of the light source mounting members 18 are in surface contact with the plate-like portion 14a of the chassis 14 and exposed to the outside of the backlight device 12. Therefore, a proportion of the heat that has been transferred to the light source mounting members 18 is transferred to the chassis 14 and dissipated from the chassis 14. The other proportion of the heat is directly dissipated from the exposed portions of the light source mounting members 18 to the outside. In comparison to a conventional backlight device in which heat is dissipated through a heat dissipation member, the heat dissipation efficiency highly improves. In the backlight device 12 according to this embodiment, heat generated by the LEDs 17 is efficiently dissipated from the light source mounting members 18 to the outside without heat dissipation members. Namely, high heat dissipation efficiency is achieved without heat dissipation members.

Each light source mounting member 18 of this embodiment includes the mounting plate 18b on which the LEDs 17 are mounted. The mounting plate 18b extends from the bottom plate 18b toward the front side (toward the light exit surface 16a) such that the plate surface of the mounting plate 18b is parallel to the light entrance surface 16b. The bottom plate 18a has a thickness larger than the thickness of the mounting plate 18b. According to this configuration, the thickness of the bottom plate 18a can be increased in a direction corresponding to the thickness direction of the light guide plate 16 (i.e. Z-axis direction). Namely, the heat dissipation capability of the bottom plate 18a can be increased without increasing the dimension of the backlight device 12 along the plate surface of the light guide plate 16 (along the X-Y plane). According to the above configuration, the heat dissipation efficiency improves although the frame size of the backlight device 12 is decreased.

The rear surface of the plate-like portion 14a (the opposite surface from the surface that faces the light guide plate 16) includes a portion that is out of contact with the bottom plates 18a and exposed to the outside of the backlight device 12. According to this configuration, a large proportion of heat transferred from the bottom plates 18a of the light source mounting members 18 to the plate-like portion 14a of the chassis 14 is dissipated from the portion of the plate-like portion 14a of the chassis 14 exposed to the outside. Therefore, heat dissipation efficiency of the backlight device 12 further improves.

The backlight device 12 of this embodiment includes the reflection sheet 20 that has light reflectivity and is in contact with the opposite surface 16c of the light guide plate 16. The reflection sheet 20 is sandwiched between the light guide plate 16 and the plate-like portion 14a of the chassis 14. According to this configuration, since the reflection sheet 20 is sandwiched between the light guide plate 16 and the chassis 14, warping of the reflection sheet 20 is less likely to occur. Therefore, even when heat is transferred to the chassis 14, wrinkles of the reflection sheet 20 due to the heat is suppressed. Therefore, a light reflecting function of the reflection sheet 20 remains preferable.

In this embodiment, trances for supplying power to the LEDs 17 are formed on the mounting plates 18b of the light source mounting members 18 on which the LEDs 17 are mounted. The LEDs 17 mounted on the light source mounting members 18 are configured to emit light while power is supplied through the traces. The light source mounting members 18 include the bottom plates 18a that are in surface contact with the chassis 14 and portions of the light source mounting members 18 are exposed to the outside of the backlight device 12. Therefore, the heat generated by the LEDs 17 while they are turned on is efficiently dissipated to the outside of the backlight device 12.

The liquid crystal display device 10 according to this embodiment includes the backlight device 12 and the liquid crystal panel 11 that includes the display surface 11c. The display panel 11 is configured to provide displays using light from the light exit surface 16a of the light guide plate 16 included in the backlight device 12. The backlight device 12 configured to provide light to the liquid crystal panel 11 has the high heat dissipation capability without heat dissipation members. Therefore, effects including maintaining the frame-size of the liquid crystal display device 10 small and improvement of operation reliability are exerted.

The liquid crystal display device 10 includes the outer frame 13 and the inner frame 22. The outer frame 13 is arranged on the display surface 11c side relative to the liquid crystal panel 11 and forms an external appearance of the liquid crystal display device 10. The liquid crystal panel 11 is sandwiched between the outer frame 13 and the backlight device 12 and held therebetween. The light source mounting members 18 are arranged away from the outer frame 13 or the inner frame 22. With this configuration, the heat generated by the LEDs 17 is less likely to be transferred from the light source mounting members 18 to the outer frame 13 and the inner frame 22. The temperature of the outer frame 13 and the temperature of the inner frame 22 may increase due to the heat; however, the temperatures of the outer frame 13 and the inner frame 22 are less likely to increase according to the above configuration. The outer frame 13 and the inner frame 22 are arranged on the display surface 11c side of the liquid crystal panel 11 and form the external appearance of the liquid crystal display device 10. Therefore, the outer frame 13 and the inner frame 22 tend to contact external objects (i.e., touchable portions). Because the temperatures of the outer frame 13 and the inner frame 22 are less likely to increase, problems are less likely to occur even when the external objects contact the outer frame 13 or the inner frame 22.

The liquid crystal display device 10 includes the fixing members 26 that fix the respective bottom plates 18a to the inner frame 22. According to this configuration, the light source mounting members 18 are stably held by the fixing members 26 in the liquid crystal display device 10. Therefore, the liquid crystal display device 10 maintains high heat dissipation efficiency.

The fixing member 26 of this embodiment is in contact with a portion of the light source mounting member 18. At least the area of the fixing member 18 in contact with the light source mounting member 18 has a lower thermal conductivity than the bottom plate 18a. According to this configuration, the light source mounting members 18 are stably held by the fixing members 18. Furthermore, when heat generated by the LEDs 17 is transferred to the light source mounting members 18, heat is less likely to be transferred from the light source mounting members 18 to the outer frame 13 and the inner frame 22 through the fixing members 26. Although the light source mounting members 18 are properly held, temperature increase in the outer frame 13 and the inner frame 22 is further less likely to occur.

The light source mounting members 18 of this embodiment include the bottom plates 18a that are arranged on the opposite surface 16c side of the light guide plate 16. According to a conventional configuration, a plate surface of the light source mounting member 18 and a plate surface of a heat dissipation member parallel to the edge surface of the light guide plate 16 (the light entrance surface 16b) are in contact with each other. Compared to the conventional configuration, the contact area between the light source mounting members 18 and the chassis 14 are easily expandable. Therefore, the heat dissipation efficiency of the backlight device 12 significantly improves.

Second Embodiment

Figure 6:
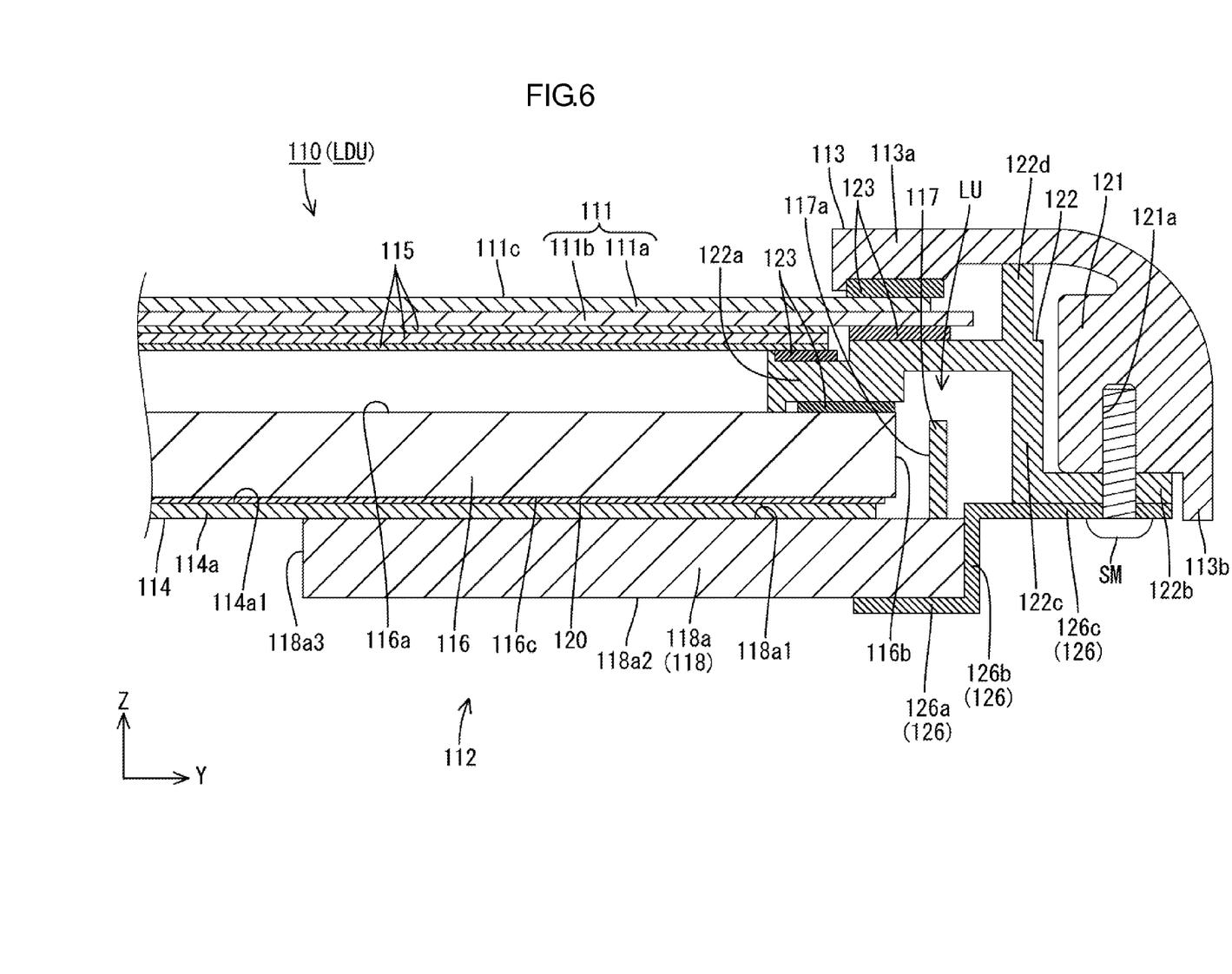
FIG. 6 is a magnified cross-sectional view of one of light source mounting members 130 and therearound included in a liquid crystal display device 110 according to a second embodiment.

A second embodiment will be described with reference to the drawings. The second embodiment includes LEDs 117 having a different light emitting type from the first embodiment and further includes light source mounting members 118 having different configurations from the first embodiment. Other configurations are the same as the first embodiment. Configurations, operations, and effects similar to the first embodiment will not be described. In FIG. 6, portions indicated by numerals including the reference numerals in FIG. 5 with 100 added thereto have the same configurations as the portions indicated by the respective reference numerals in the first embodiment.

In a backlight device 112 according to the second embodiment, as illustrated in FIG. 6, the light source mounting members 118 include bottom plates 118a, respectively, but do not include mounting plates such as the ones included the first embodiment. The LEDs 117 are arranged on an outer end portion of a front surface 118a1 of each bottom plate 118a. Each LED 117 includes a light emitting surface 117a that is one of side surfaces with respect to a mounting surface. Namely, the LED 117 is a side emitting type LED. The LED 117 is mounted on the bottom plate 118a such that the light emitting surface 117a faces a light entrance surface 116b and a rear surface of the LED 117 faces a front surface 118a1 of the bottom plate 118a. A large proportion of heat that is generated by the LEDs 118 while they are turned on is transferred to the bottom plates 118a of the light source mounting members 118. A heat transfer route from the bottom plates 118a is similar to the first embodiment and will not be descried in detail. According to this configuration, heat generated by the LEDs 118 is transferred to the bottom plates 118a and dissipated with no mounting plate. Therefore, heat is dissipated in a shorter time compared with the first embodiment, that is, the heat dissipation capability is further improved.

Third Embodiment

Figure 7:
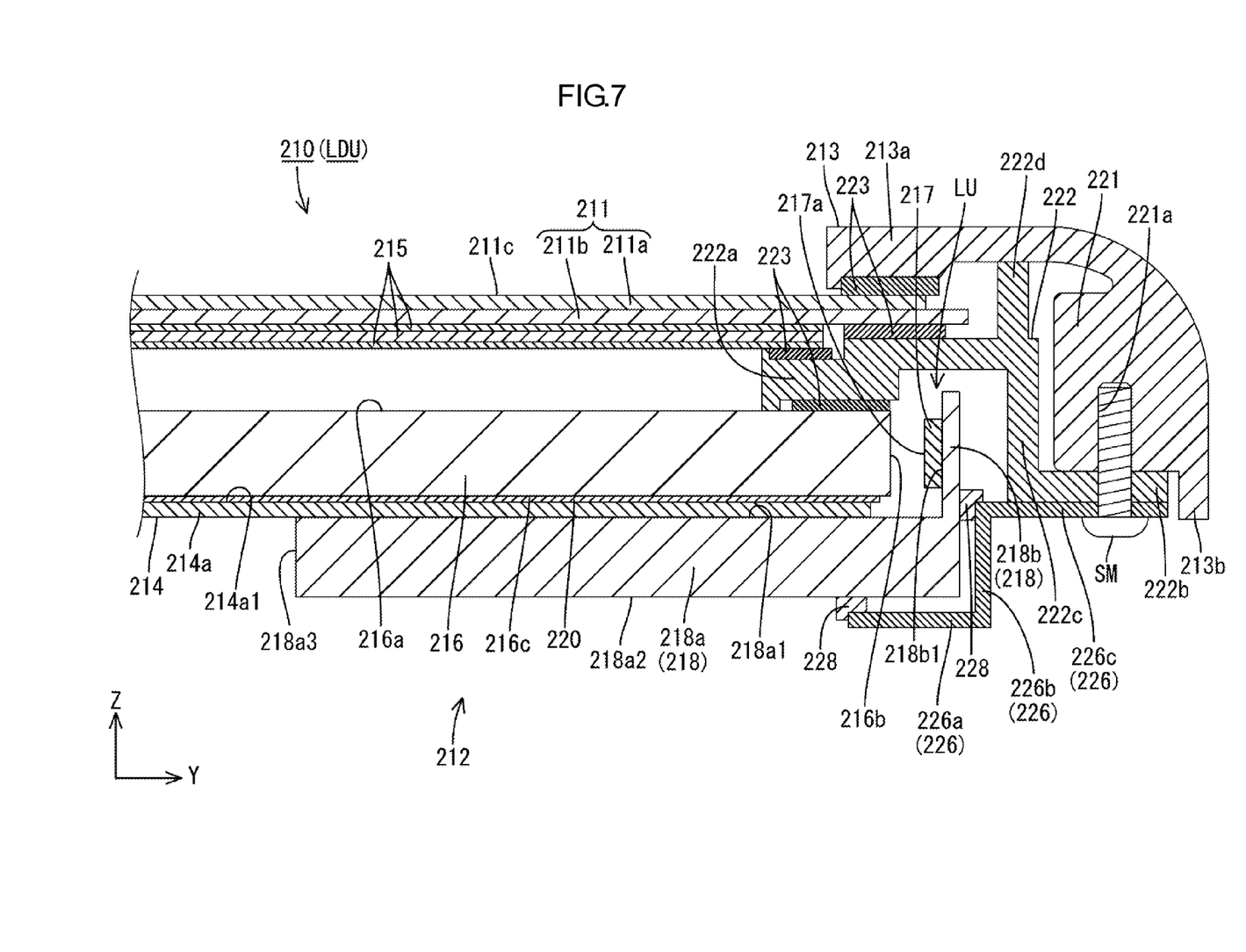
FIG. 7 is a magnified cross-sectional view of one of light source mounting members 230 and therearound included in a liquid crystal display device 210 according to a third embodiment.

A third embodiment will be described with reference to the drawings. The third embodiment includes light source mounting members 218 that are arranged away from fixing members 226, respectively. This configuration differs from the first embodiment. Other configurations are the same as the first embodiment. Configurations, operations, and effects similar to the first embodiment will not be described. In FIG. 7, portions indicated by numerals including the reference numerals in FIG. 5 with 200 added thereto have the same configurations as the portions indicated by the respective reference numerals in the first embodiment.

In a backlight device 212 according to the third embodiment, as illustrated in FIG. 7, each fixing member 226 is arranged away from the corresponding light source mounting member 218. Namely, first supporting portions 226a and second supporting portions 226b of the fixing members 226 are out of contact with bottom plates 218a of the respective light source mounting members 218. Namely, they are arranged with a gap therebetween. The shape and the configurations of the fixing members 226 are similar to the first and second embodiments and will not described in detail. As illustrated in FIG. 7, in the gap between the light source mounting member 218 and the fixing member 226, two heat insulating and cushioning members 228 are arranged. An example of the heat insulating and cushioning members 228 is a urethane form. The heat conductivity of the heat insulating and cushioning members 228 is lower than those of the light source mounting members 218 and the fixing members 226. The heat insulating and cushioning members 228 have a high cushioning ability. One of the heat insulating and cushioning members 228 is arranged between an end of the first supporting portion 226a of the fixing member 226 (an inner edge portion) and a rear surface 218a2 of the bottom plate 218a of the light source mounting member 218. The other one of the heat insulating and cushioning members 228 is arranged between a front edge of the second supporting portion 226b of the fixing member 226 and an outer plate surface (i.e. an opposite side from a light entrance surface 216b) of the mounting plate 218b of the light source mounting member 218, specifically, at a rear end portion of the mounting plate 218b (a boundary area between the mounting plate 218b and the bottom plate 218a).

As described above, the light source mounting member 218 and the fixing member 226 is arranged away from each other with the heat insulating and cushioning members 228 therebetween. According to this configuration, when heat generated by the LEDs 217 is transferred to the light source mounting members 218, heat is less likely to be transferred from the light source mounting members 218 to the fixing members 226. Namely, heat transfer from the fixing members 226 to the inner frame 222 and the outer frame 213 to which the fixing members 226 are fixed is less likely to occur. In the liquid crystal display device 210, the temperature of the outer frame 113 that forms the front external appearance (i.e., a touchable portion) is less likely to increase. Therefore, problems are less likely to occur even when external objects contact the outer frame 213. Furthermore, the light source mounting members 218 are held by the respective fixing members 226 while friction sounds produced by the light source mounting members 218 and the fixing members 226 are reduced by the heat insulating and cushioning members 228.

Modifications of the above embodiments will be listed below. (1) In each of the above embodiments, LED units are arranged so as to correspond to opposed edge surfaces of the light guide plate. However, the LED units may be arranged so as to correspond to three or more edge surfaces of the light guide plate. The LED unit may be arranged corresponding to a single edge surface of the light guide plate. According to this configuration, the bottom plate of the light source mounting member may extend over an entire surface of the plate-like portion of the chassis. Thus, an area of the portion of the bottom plate exposed to the outside increases. Therefore, heat dissipation efficiency of the backlight device further improves.

(2) In each of the above embodiments, the light source mounting members are held by the fixing members. However, the fixing members may be omitted and the light source mounting members may be held by other components. For example, a portion of each light source mounting member may be screwed to the chassis and held thereby.

(3) In each of the first and third embodiments, the mounting plate of the light source mounting member extends from the bottom plate toward the light exit surface so as to be perpendicular to the bottom plate. However, the light source mounting member may be a flexible circuit board having flexibility, and the flexible circuit board may be bent into a substantially an L-like shape to form the bottom plate and the mounting plate.

(4) In each of the above embodiments, the liquid crystal panel is sandwiched and held between the outer frame and the inner frame. However, the inner frame may be omitted. For example, the optical member and the liquid crystal panel may be placed on the light exit surface of the light guide plate in this sequence, and the outer frame may hold down edge portions of the display surface of the liquid crystal panel. According to this configuration, the liquid crystal panel may be held.

(5) In each of the above embodiments, the chassis is a plate-like member. However, the chassis may include portions other than the plate-like member.

(6) The configurations and the shapes of the light source mounting members can be modified as appropriate.

(7) In each of the above embodiments, the liquid crystal display device that includes the liquid crystal panel as a display panel is used as an example. However, the scope of the present invention is applicable for display devices that include other types of display panels.

(8) In each of the above embodiments, the television device that includes the tuner is used as an example. However, the scope of the present invention is applicable for display devices without tuners.

The above embodiments described in detail are only examples and the scope of the claimed invention is not limited to the embodiments. The technical scope of the claimed invention includes various modifications of the above embodiments.

The technical elements described in this specification and the drawings may be used independently or in combination to achieve the technical benefits. The combinations are not limited to those in claims. With the technologies described in this specification and the drawings, multiple objectives may be accomplished at the same time. However, the technical benefits can be achieved by accomplishing even only one of the objectives.

EXPLANATION OF SYMBOLS

TV: television device, Ca, Cb: cabinet, T: tuner, S: stand, 10, 110, 210: liquid crystal display device, 11, 111, 211: liquid crystal panel, 13, 113, 213: outer frame, 14, 114, 214: chassis, 14a, 114a, 214a: plate-like portion, 15, 115, 215: optical member, 16, 116, 216: light guide plate, 17, 117, 217: LED, 18, 118, 218: light source mounting member, 18a, 118a, 218a: bottom plate, 18b, 218b: mounting plate, 20, 120, 220: reflection sheet, 22, 122, 222: inner frame, 23, 123, 223: cushioning member, 26, 126, 226: fixing member, 228: insulating and cushioning member.

The invention claimed is:

1. A lighting device comprising:
    a light source;
    a light guide plate including a light exit surface, an opposite surface, and a light entrance surface opposite a light emitting surface of the light source to guide light from the light source toward the light exit surface;
    a chassis including a plate shaped portion at a side adjacent to the opposite surface of the light guide plate;
    a light source mounting member to mount the light source, the light source mounting member including a bottom plate including a first plate surface and a second plate surface, the first plate surface in surface-contact with a surface of the plate shaped portion opposite from a surface thereof facing the light guide plate, a portion of the second plate surface exposed to an external side;
    a display panel including a display surface to display an image using light from the light exit surface of the light guide plate;
    a frame-shaped member on a display surface side of the display panel and holding the display panel such that the display panel is between the frame-shaped member and the light guide plate, the frame-shaped member providing an external appearance of the display device;
    a fixing member fixing the bottom plate to the frame-shaped member, wherein
    the light source mounting member is separated from the frame-shaped member.

2. The lighting device according to claim 1, wherein
    the light source mounting member includes a mounting plate on which the light source is mounted, the mounting plate extending from the bottom plate toward a light exit surface side such that a plate surface of the mounting plate is parallel to the light entrance surface; and
    the bottom plate has a thickness larger than a thickness of the mounting plate.

3. The lighting device according to claim 1, wherein the surface of the plate-like portion opposite from the surface thereof facing the light guide plate includes a portion that is not in contact with the bottom plate and exposed to the external side.

4. The lighting device according to claim 1, further comprising a reflection sheet having light reflectivity and being in contact with the opposite surface of the light guide plate, wherein the reflection sheet is sandwiched between the light guide plate and the plate-like portion of the chassis.

5. The lighting device according to claim 1, wherein a trace for supplying power to the light source is formed on the light source mounting member on which the light source is mounted.

6. The display device according to claim 1, wherein
    the fixing member is in contact with a portion of the light source mounting member, and
    a portion of the fixing member in contact with the portion of the light source mounting member has thermal conductivity lower than thermal conductivity of the bottom plate.

7. The display device according to claim 1, at further comprising an inner frame including an inner frame portion and an outer frame portion, the inner frame portion between the display panel and the light guide plate, the outer frame portion between the frame-shaped member and the fixing member.

8. The display device according to claim 7, wherein
    the light source mounting member includes a mounting plate on which the light source is mounted, the mounting plate extending from the bottom plate toward a light exit surface side such that a plate surface of the mounting plate is parallel to the light entrance surface, the mounting plate and the light source are covered with the inner frame from a display panel side, and the mounting plate is out of contact with the frame-shaped member.

9. The display device according to claim 1, wherein the fixing member is away from the light source mounting member, and the display device further comprises a cushioning member having a cushioning ability, the cushioning member between the fixing member and the light source mounting member and fixed to the fixing member and the light source mounting member.

10. The display device according to claim 9, wherein the cushioning member has thermal conductivity lower than thermal conductivity of the light source mounting member.

11. The display device according to claim 1, wherein the display panel includes a pair of substrates and liquid crystals sealed between the substrates.

12. A television device comprising the display device according to claim 1.

* * * * *